Patented Jan. 9, 1945

2,367,001

UNITED STATES PATENT OFFICE 2,367,001

METHOD OF PRODUCING AMINO DERIVATIVES OF DEHYDROABIETIC ACID COMPOUNDS

William P. Campbell, Newark, Del., assignor to Hercules Powder Company, Wilmington, Del., a corporation of Delaware No Drawing. Application June 27, 1942,
Serial No. 448,869

13 Claims. (Cl. 260—102)

This invention relates to an improved method for producing amino derivatives of dehydroabietic acid and dehydroabietic acid compounds containing the hydrocarbon nucleus of dehydroabietic acid.

The production of amino derivatives of dehydroabietic acid and related compounds was described in U. S. 2,240,936 to Edwin R. Littmann. The method of producing such products described by Littmann involved the reduction of the nitro compound obtained by direct nitration of the dehydroabietic acid or compound thereof. Due to the fact that it is difficult to control the nitration reaction to avoid formation of considerable amounts of the dinitro derivative, the production of mono amino derivatives can only be accomplished by the Littmann procedure with considerable difficulty and with low yields.

Now, in accordance with this invention, it has been discovered that amino derivatives of dehydroabietic acid and dehydroabietic acid compounds containing the hydrocarbon nucleus of dehydroabietic acid may be obtained by a process which makes possible their preparation in a more efficient manner and in higher yields. The improved process involves heating a halogenated derivative of either dehydroabietic acid or a compound derived from dehydroabietic acid containing the hydrocarbon nucleus of dehydroabietic acid, such as dehydroabietyl alcohol, dehydroabietane, esters of dehydroabietic acid, salts of dehydroabietic acid, ethers of dehydroabietyl alcohol and alkoxides of dehydroabietyl alcohol, at a temperature within the range of about 150° C. to about 280° C. with ammonia, a primary organic amine or a secondary organic amine.

The improved process may be illustrated by the following specific examples. All parts expressed in the examples represent parts by weight unless otherwise indicated.

Example I

One hundred and three parts of mono bromodehydroabietic acid were heated with 1800 parts of 28% aqueous ammonia and 20 parts of cuprous bromide in an autoclave at a temperature of 200° C. for a period of 12 hours. The reaction solution was then cooled and filtered. A small amount of a solid water insoluble product was removed by the filtration. The ammoniacal filtrate of deep blue color was acidified with acetic acid, whereupon the insoluble mono aminodehydroabietic acid precipitated in crude form. The precipitate was filtered off, washed with water and then dissolved in ether. The ether solution was treated with 1% sodium hydroxide solution which extracted the amino product from the ether solution. The sodium hydroxide solution was then neutralized with acetic acid to reprecipitate the amino compound. The amino compound was removed and dried and again dissolved in ether. To the ether solution obtained an equal volume of a saturated ethereal solution of hydrogen chloride was added, causing the precipitation of the crystalline hydrochloride of mono aminodehydroabietic acid. The yield of the hydrochloride was 56.5 parts. The free amino acid was regenerated by dissolving the hydrochloride in 225 parts of ethyl alcohol containing 2 parts of potassium hydroxide, acidifying with acetic acid and precipitating by the addition of water. By recrystallization from alcohol a yield of 35.7 parts of nearly colorless mono aminodehydroabietic acid was obtained having a melting point of 211 to 214° C. This yield corresponds to 42% of the theoretical.

Example II

Fifty parts of mono bromodehydroabietic acid were heated with 500 parts of a 20% aqueous solution of ethylamine and 10 parts of cuprous oxide in an autoclave at a temperature of 200° C. for 10 hours. The ethyl aminodehydroabietic acid formed was isolated by the procedure shown in Example I.

The amino derivatives of dehydroabietic acid and dehydroabietic acid compounds containing the hydrocarbon nucleus of dehydroabietic acid produced in accordance with the process of this invention will contain one or more amino groups or substituted amino groups as substituents in the aromatic nucleus. The number of such groups introduced will be dependent on the number of halogen atoms substituted in the aromatic nucleus of the halogenated dehydroabietic acid or dehydroabietic acid compound used in the process. The process is particularly adapted to production of the mono aminodehydroabietic acid or dehydroabietic acid compounds from the mono halogenated products. The aromatic nucleus of the dehydroabietic acid molecule contains three unsubstituted positions. It is impossible, therefore, to have an amino derivative containing more than three amino groups in the aromatic nucleus. However, two of the positions are more reactive than the third and accordingly the substitution of amino groups will usually be confined to the substitution of either one or two amino groups. The exact position in the aromatic nucleus in which the amino group is substituted is not of particular significance, although it is believed that in the case of the amino derivative that the amino group will be in the 6 position in the aromatic nucleus.

The halogenated dehydroabietic acid or the halogenated dehydroabietic acid derivatives containing the hydrocarbon nucleus of dehydroabietic acid which may be utilized in the process of the invention may be obtained in any suitable manner. A desirable procedure involves the direct halogenation of the sulfonated dehydroabietic acid or sulfonated dehydroabietic acid compounds. Thus, for example, the direct bromination of the mono sulfodehydroabietic acid with use of an aqueous bromine solution provides the mono bromodehydroabietic acid in high yield. The production of the halogenated dehydroabietic acid compounds containing the hydrocarbon nucleus of dehydroabietic acid which are useful in the processes of this invention may be accomplished by halogenation of the sulfonated dehydroabietic compounds, such as sulfonated dehydroabietyl alcohol, sulfonated dehydroabietane, sulfonated esters of dehydroabietic acid, sulfonated salts of dehydroabietic acid, sulfonated ethers of dehydroabietyl alcohol and sulfonated alkoxides of dehydroabietyl alcohol. Preparation of the sulfonated dehydroabietic acid or the sulfonated dehydroabietic acid compounds may be carried out in accordance with the process described in U. S. Patent 2,207,890 to Edwin R. Littmann. The brominated and chlorinated derivatives will be particularly preferred in the process since they are most easily prepared. The iodo and fluoro derivatives are less reactive in the described process and thus give lower yields.

In carrying out the process of the invention, as shown by the examples, the halogenated dehydroabietic acid or halogenated dehydroabietic acid compound is heated with ammonia, a primary organic amine or a secondary organic amine. The heating is conveniently carried out with use of aqueous solutions of ammonia or an amine, such as methylamine, ethylamine, propylamine, butylamine, dimethylamine, diethylamine, etc. The concentration of the aqueous solution utilized is not critical and desirably will be from about 5% to about 30% concentration. The amount of ammonia or organic amine used will generally be an excess over the amount theoretically necessary to combine with the halogenated derivative and to substitute the amine group for the halogen of the halogenated dehydroabietic acid material being treated.

The temperature for carrying out the process may be within the range of about 150° to about 280° C. but will preferably be from about 190° to about 220° C. The time required for completion of the reaction will depend on the particular temperature used and the particular halogenated dehydroabietic acid material being treated, as well as on the particular halogen involved. Generally speaking, the time required for the reaction to become complete will be from about 3 to about 20 hours. After completion of the reaction and formation of the amino derivative in crude form, the reaction mixture may be treated in any one of a number of ways to recover the amino product in purified form. In the examples the recovery of the product was carried out by acidifying the reaction mixture and dissolving the precipitated amino product in ether, followed by extraction of the product from the ether solution and subsequently reprecipitation by acidification. In the examples the hydrochloride of the amino compound was formed and isolated and the free amine recovered from the hydrochloride by neutralization. It is understood that the particular purification process illustrated was shown merely for the purposes of illustration and that other purification procedures will be apparent to those skilled in the art.

It may be desirable in certain instances to catalyze the reaction between the ammonia or the primary organic amine and the halogenated dehydroabietic acid or halogenated dehydroabietic acid compound. The catalysts which may be employed are those which are known to accelerate the replacement of halogen atoms by amino groups in aromatic halogenated compounds. Suitable catalysts are, for example, copper and copper salts, such as for example, cuprous bromide, cuprous chloride, cuprous oxide, etc.

The process of producing amino dehydroabietic acid and amino dehydroabietic acid compounds described in accordance with this invention presents several improvements over the method for producing such products described in the prior art. The improved process provides a means for preparing the mono aminodehydroabietic acid and mono aminodehydroabietic acid compounds containing the hydrocarbon nucleus of dehydroabietic acid in a highly efficient manner and in good yield. By the prior known procedure the production of the mono amino products was extremely difficult. The amino dehydroabietic acid and amino dehydroabietic acid compounds which may be produced in accordance with this invention are highly useful as intermediates in the production of dyes, as antioxidants and for other important uses.

What I claim and desire to protect by Letters Patent is:

1. The method of producing an amino dehydroabietic acid compound containing the hydrocarbon nucleus of dehydroabietic acid which comprises heating a compound selected from the group consisting of dehydroabietic acid, dehydroabietyl alcohol, dehydroabietane, esters of dehydroabietic acid, salts of dehydroabietic acid, ethers of dehydroabietyl alcohol and alkoxides of dehydroabietyl alcohol and which compound contains a halogen substituent in its aromatic nucleus, at a temperature within the range of about 150° C. to about 280° C. with a material selected from the group consisting of ammonia, primary organic amines and secondary organic amines.

2. The method of producing an amino dehydroabietic acid compound containing the hydrocarbon nucleus of dehydroabietic acid which comprises heating a compound selected from the group consisting of dehydroabietic acid, dehydroabietyl alcohol, dehydroabietane, esters of dehydroabietic acid, salts of dehydroabietic acid, ethers of dehydroabietyl alcohol and alkoxides of dehydroabietyl alcohol and which compound contains a halogen substituent in its aromatic nucleus, at a temperature within the range of about 190° C. to about 220° C. with a material selected from the group consisting of ammonia, primary organic amines and secondary organic amines.

3. The method of producing an amino dehydroabietic acid compound containing the hydrocarbon nucleus of dehydroabietic acid which comprises heating a compound selected from the group consisting of dehydroabietic acid, dehydroabietyl alcohol, dehydroabietane, esters of dehydroabietic acid, salts of dehydroabietic acid, ethers of dehydroabietyl alcohol and alkoxides of dehydroabietyl alcohol and which compound contains a halogen substituent in its aromatic nucleus, at a temperature within the range of about 150° C. to about 280° C. with ammonia.

4. The method of producing an amino dehydroabietic acid compound containing the hydrocarbon nucleus of dehydroabietic acid which comprises heating a compound selected from the group consisting of dehydroabietic acid, dehydroabietyl alcohol, dehydroabietane, esters of dehydroabietic acid, salts of dehydroabietic acid, ethers of dehydroabietyl alcohol and alkoxides of dehydroabietyl alcohol and which compound contains a halogen substituent in its aromatic nucleus, at a temperature within the range of about 150° C. to about 280° C. with an aqueous solution of ammonia.

5. The method of producing an amino dehydroabietic acid compound containing the hydrocarbon nucleus of dehydroabietic acid which comprises heating a compound selected from the group consisting of dehydroabietic acid, dehydroabietyl alcohol, dehydroabietane, esters of dehydroabietic acid, salts of dehydroabietic acid, ethers of dehydroabietyl alcohol and alkoxides of dehydroabietyl alcohol and which compound contains a halogen substituent in its aromatic nucleus, at a temperature within the range of about 150° C. to about 280° C. with a primary organic amine.

6. The method of producing an amino dehydroabietic acid compound containing the hydrocarbon nucleus of dehydroabietic acid which comprises heating a compound selected from the group consisting of dehydroabietic acid, dehydroabietyl alcohol, dehydroabietane, esters of dehydroabietic acid, salts of dehydroabietic acid, ethers of dehydroabietyl alcohol and alkoxides of dehydroabietyl alcohol and which compound contains a halogen substituent in its aromatic nucleus, at a temperature within the range of about 150° C. to about 280° C. with an aqueous solution of a primary organic amine.

7. The method of producing an amino dehydroabietic acid which comprises heating dehydroabietic acid having a halogen substituent in its aromatic nucleus at a temperature within the range of about 150° C. to about 280° C. with an aqueous solution of ammonia.

8. The method of producing an amino dehydroabietic acid which comprises heating dehydroabietic acid having a halogen substituent in its aromatic nucleus at a temperature within the range of about 190° C. to about 220° C. with an aqueous solution of ammonia.

9. The method of producing an amino dehydroabietic acid which comprises heating dehydroabietic acid having a bromine substituent in its aromatic nucleus at a temperature within the range of about 150° C. to about 280° C. with an aqueous solution of ammonia.

10. The method of producing an amino dehydroabietic acid which comprises heating dehydroabietic acid having a chlorine substituent in its aromatic nucleus at a temperature within the range of about 150° C. to about 280° C. with an aqueous solution of a primary organic amine.

11. The method of producing an amino dehydroabietic acid compound containing the hydrocarbon nucleus of dehydroabietic acid which comprises heating a compound selected from the group consisting of dehydroabietic acid, dehydroabietyl alcohol, dehydroabietane, esters of dehydroabietic acid, salts of dehydroabietic acid, ethers of dehydroabietyl alcohol and alkoxides of dehydroabietyl alcohol and which compound contains a halogen substituent in its aromatic nucleus, at a temperature within the range of about 150° C. to about 280° C. with a material selected from the group consisting of ammonia, primary organic amines and secondary organic amines in the presence of a catalyst for the reaction.

12. The method of producing a mono aminodehydroabietic acid compound containing the hydrocarbon nucleus of dehydroabietic acid which comprises heating a compound selected from the group consisting of dehydroabietic acid, dehydroabietyl alcohol, dehydroabietane, esters of dehydroabietic acid, salts of dehydroabietic acid, ethers of dehydroabietyl alcohol and alkoxides of dehydroabietyl alcohol and which compound contains one halogen substituent in its aromatic nucleus at a temperature within the range of about 150° C. to about 280° C. with an aqueous solution of ammonia.

13. The method of producing a mono aminodehydroabietic acid which comprises heating dehydroabietic acid having one halogen substituent in its aromatic nucleus at a temperature within the range of about 150° C. to about 280° C. with an aqueous solution of ammonia.

WILLIAM P. CAMPBELL.